United States Patent [19]

Iguma

[11] Patent Number: 4,583,160
[45] Date of Patent: Apr. 15, 1986

[54] PRIORITY CONTROL APPARATUS FOR A BUS IN A BUS CONTROL SYSTEM HAVING INPUT/OUTPUT DEVICES

[75] Inventor: Junichi Iguma, Hadano, Japan

[73] Assignee: Hitachi, Ltd., Tokyo, Japan

[21] Appl. No.: 709,886

[22] Filed: Mar. 8, 1985

Related U.S. Application Data

[63] Continuation of Ser. No. 194,816, Oct. 7, 1980, abandoned.

[30] Foreign Application Priority Data

Oct. 8, 1979 [JP] Japan .............................. 54-129636

[51] Int. Cl.⁴ .............................................. G06F 9/46
[52] U.S. Cl. .................................................. 364/200
[58] Field of Search ............................. 364/200, 900; 340/825.5

[56] References Cited

U.S. PATENT DOCUMENTS

| 3,200,380 | 8/1965 | MacDonald et al. | 364/200 |
| 3,919,692 | 11/1975 | Kronies et al. | 364/200 |
| 4,073,005 | 12/1978 | Parkin | 364/200 |
| 4,096,572 | 6/1978 | Namimoto | 364/200 |
| 4,214,305 | 7/1980 | Tokita et al. | 364/200 |
| 4,237,534 | 12/1980 | Felix | 364/200 |
| 4,318,174 | 2/1982 | Suzuki et al. | 364/200 |

Primary Examiner—Gareth D. Shaw
Assistant Examiner—Daniel K. Dorsey
Attorney, Agent, or Firm—Antonelli, Terry & Wands

[57] ABSTRACT

A bus control system in which priority for the use of a bus is set in the order of an I/O device, a hardware operation unit and a data processing unit so that the use of the bus by the data processing unit is suppressed during the continuous processing operation of the hardware operation unit in order to allow high speed processing of the hardware operation unit and to allow interruption by the I/O device to permit the use of bus with higher priority without stopping the processing of the higher priority I/O device.

16 Claims, 14 Drawing Figures

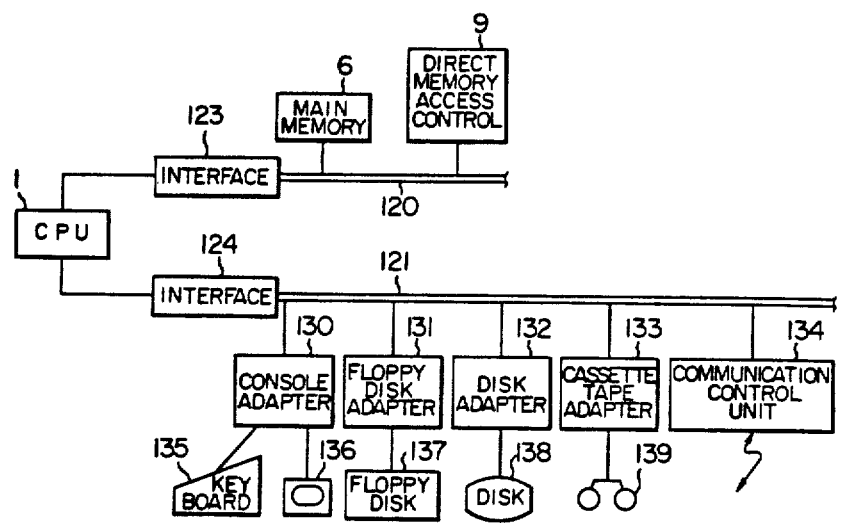

4,583,160

PRIORITY CONTROL APPARATUS FOR A BUS IN A BUS CONTROL SYSTEM HAVING INPUT/OUTPUT DEVICES

This is a continuation of application Ser. No. 194,816 filed Oct. 7, 1980 now abandoned.

BACKGROUND OF THE INVENTION

The present invention relates to a bus control system, and more particularly to a bus control system capable of high speed processing, priority processing and interrupt processing of bus data.

It has been known to connect a data processing unit, memory units and input and/or output (I/O) devices through buses and transfer addresses and data among those units and devices through the buses for data processing. The buses for transferring the address signals and the data signals are referred to as an address bus and a data bus, respectively.

A control system for those buses is well known by, for example, the guide book entitled "8289 Bus Arbiter" published by Intel Corp. in Feburary 1979.

In the known bus control system, when a single bus is shared by a plurality of I/O devices, the I/O devices, may content for the use of the bus. In order to resolve the contention, a polling system (scan system) and a contention system (interrupt system) have been used.

In the polling system, acknowledgement for sending is given from the data processing unit to the I/O devices sequentially in the order of priority. When a large number of I/O devices are connected, a time interval for the respective I/O devices to receive the acknowledgement for sending increases and hence a waiting time of the respective I/O device increases. In addition, since the same acknowledgement signal is repeatedly sent irrespective of the sending frequency of each of the I/O devices, the efficiency of bus utilization is low.

In this system, while one I/O device is continuously using the bus, a higher priority I/O device cannot interrupt even if it requests to use the bus.

In the contention system, the data processing unit does not control the I/O devices but the respective I/O device sends a request-to-send signal to inform the bus request to other I/O devices before it sends out a signal on the bus. In this system, the data processing unit has the same order of priority as the I/O devices. When more than one I/O device issues the request-to-send signals simultaneously, the I/O device of the highest priority is given right to use the bus.

In this system, even when one I/O device wishes to continue the use of the bus, other I/O devices may interrupt and the sending of a command by the first I/O device will be disconnected.

Furthermore, in the prior art system, when a high speed processing unit, such as a hardware operation unit, is operated at a high speed, continuous operation thereof is interrupted because a memory request is issued from another device every time a memory request is completed. Accordingly, a desired high speed operation is not attained. If the hardware operation unit is allowed to issue memory requests sequentially in order to attain the high speed operation, the data transfer from another device to the memory unit is inhibited or interrupted which can not otherwise be accepted at an end of block of commands.

SUMMARY OF THE INVENTION

Therefore, it is an object of the present invention, in order to solve those problems described above, to provide a bus control system which allows the continuous use of a bus by a high speed data processing unit until interruption of usage of the bus by a higher priority processing unit, such as a hardware operation unit until interruption of usage of the bus by higher priority input output units.

In the bus control system of the present invention, the high speed processing unit for the bus data is given a lower priority for the use of the bus than other units and while the high speed processing unit is processing the bus data the use of the bus by a data processing unit which executes instructions is suppressed so that the high speed processing unit is given a higher priority than the data processing unit, and when an interruption request is issued by another unit, the high speed processing unit to which the interruption request is issued interrupts the high speed processing of the bus data, and after the interruption processing by the data processing unit has been completed, the high speed processing of the bus data is reinitiated by the reinitiation request from the data processing unit.

According to the present invention, the priority for the use of the bus is given in the following order from highest priority to the lowest priority to the I/O devices, the hardware operation unit and the data processing unit and the use of the bus by the data processing unit is suppressed during the continuous processing operation of the hardware operation unit in order to allow high speed processing of the operation unit. Since higher priority processing is accepted even during the continued processing operation, the processing of the I/O device is not stopped. In addition, since the hardware operation unit detects an interruption request with higher priority, the interruption request is not neglected.

BRIEF DESCRIPTION OF THE DRAWINGS

FIG. 1 shows an example of bus connection of a data processing system to which the present invention is applied.

FIG. 2 shows a screen of a display device used in the system of FIG. 1.

DESCRIPTION OF THE PREFERRED EMBODIMENTS

Figure 3:
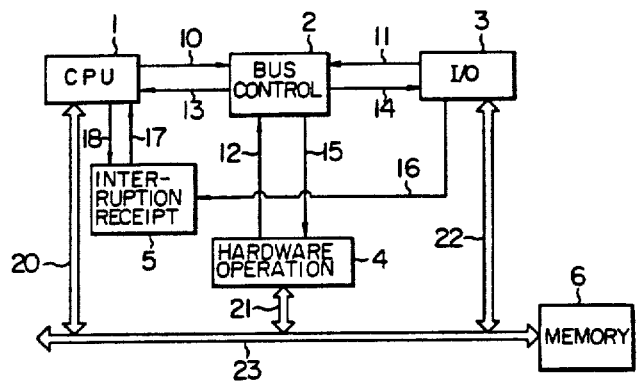
FIG. 3 shows a block diagram of a conventional data processing system having a high speed processing unit.

The preferred embodiments of the present invention will now be explained with reference to accompanying drawings.

FIG. 1 shows a block diagram of a data processing system to which the present invention is to be applied. In FIG. 1, a data processing unit (CPU) 1 is connected to a memory bus 120 through an interface circuit 123 and to an I/O bus 121 through an interface circuit 124. Connected to the memory bus 120 are a main memory 6 and a direct memory access (DMA) controller 9, and connected to the I/O bus 121 are a keyboard device 135 and a display device 136 through a console adapter 136, a floppy disk device 137 through a floppy disk adapter 131, a magnetic disk device 138 through a disk adapter 132, a cassette type device 139 through a cassette type adapter 133, and a communication control unit 134.

When the display device 136 shown in FIG. 1 is used as an inquiry terminal for the computer system, the data processing unit 1 must respond on real time basis but it is impossible to attain an immediate response because programmed processing of the data processing unit 1 takes too much time.

As shown in FIG. 2, the display device 136 groups characters displayed into groups of successive characters (fields) of the same nature, adds define field characters (DFC) defining the nature of the fields at leading positions of the fields and controls intensified display, color display, blink, line mark, numerals, transfer or print. The DFC character occupies one character area in an image memory but it occupies only a position designated by D on a display screen and it is not displayed. The data processing unit 1 must search the next DFC position on the display screen or search a field to be transferred to control the display image at a high speed. For an inquiry request, it must retrieve a character from a file such as the disk device 138 or update it. However, the data processing system has a low processing speed except the high speed data processing unit 1 and hence information is not rapidly displayed on the screen when an operator depresses a control button on the display device 136.

Accordingly, in the prior art system, a hardware operation unit 4 is separately provided as shown in FIG. 3 to enable high speed character retrieval or update for the main memory 6 or the file unit.

In the system shown in FIG. 3, an independent bus control unit 2 is provided to monitor and arrange the use of the buses 20, 22 and 23 in order to efficiently control the buses to attain one to one data exchange between the units by time sharing of the buses.

Namely, when a device requesting the use of the bus 20, 22 or 23 issues a request for the use of bus (hereinafter referred to as a bus request or BUSREQ) to the bus control unit 2, the bus control unit 2 checks the presence of a bus request from any other device and the priority thereof, and if the bus request is acceptable the bus control unit 2 issues an acknowledgement of the use of bus (hereinafter referred to as a bus acknowledge or BUSACK). Upon the receipt of the bus acknowledge, the bus requesting device issues a request for the read/-write of memory (hereinafter referred to as a memory request or MREQ) to the memory unit 6 if the request is to read or write data from or in the memory unit 6. Thus the data is read or written. In this manner, the data processing unit 1 fetches the instruction from the memory unit 6 or stores the calculation result in the memory unit 6 while the I/O device 3 can store the external data in the memory unit 6 or read the data from the memory unit 6 to send it externally.

However, even when the hardware operation unit 4 is to be operated at a high speed, it cannot operate continuously because a memory request is issued by another unit or device each time a preceding memory request has been processed. As a result, it is impossible to attain the desired high speed operation. Further, in such a case where the hardware operation unit 4 is allowed to issue memory requests successively to attain a high speed operation, the data transfer from other units or devices to the memory unit 6 is inhibited, or an interruption which would otherwise be accepted at the end of a block of instruction cannot be accepted. Those cases will be further explained with reference to FIGS. 3, 4 and 5.

Referring to FIG. 3, when a BUSREQ 10 is issued from the data processing unit (CPU) 1 to the bus control unit 2, the bus control unit 2 sends back a BUSACK 13. Similarly, when BUSREQ's 11 and 12 are sent from the I/O device 3 and the hardware operation unit 4, respectively, to the bus control unit 2, the bus control unit 2 sends back BUSACK's 14 and 15 to the device and the unit, respectively. In actuality, a plurality of I/O devices are connected although only one device 3 is shown in FIG. 3. The I/O device 3 then sends an interruption request 16 to an interruption reception unit 5 which in turn sends a representative interruption request 17 to the data processing unit 1. The data processing unit 1 then sends back an acknowledgement for interruption 18 to the interruption reception unit 5.

While the buses 20-23 are the same signal line, they are designated differently to identify the sources of signal.

Figure 4:
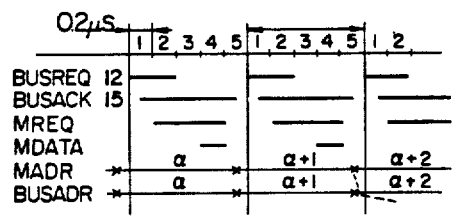
FIGS. 4 and 5 show timing charts for the operation of FIG. 3.
Figure 5:
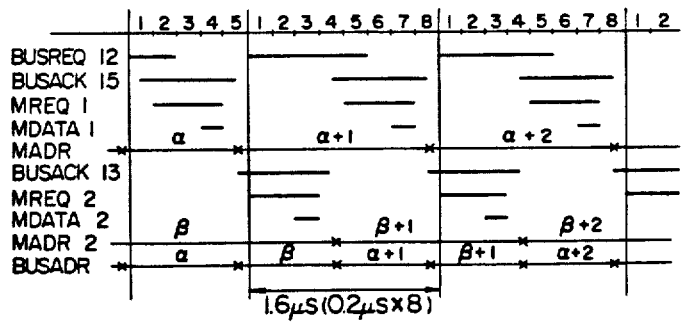

FIG. 4 shows a time chart when the hardware operation unit 4 exclusively uses the buses, and FIG. 5 shows a time chart when the hardware operation unit 4 and the data processing unit 1 use the buses in a contention mode.

In FIGS. 4 and 5, an abscissa represents cycles, one cycle time being assumed as 0.2 $\mu$s (micro second), and one memory processing time extends from cycle number 1 to a point before the next cycle number 1.

In FIG. 4, when the hardware operation unit 4 sends a BUSREQ 12 in the cycle 1, the bus control unit 2 sends back a BUSACK 15. In response to the BUSACK 15, the hardware operation unit 4 starts to use the bus and issues a MREQ to the memory unit 6. In a read mode, when the memory unit 6 receives the MREQ, it sends out memory data MDATA after a predetermined time interval. When the hardware operation unit 4 receives the MDATA, it stops to send the MREQ and adds one to a memory address MADR to change its content "$\alpha$" to ($\alpha+1$).

On the other hand, the bus control unit 2 stops to receive the bus request while the MREQ is being issued but it again receives the bus request after the MREQ terminates. Namely, in FIG. 4, the bus control unit 2 starts to receive the BUSREQ 12 from the beginning of the cycle 5 but it sends out no BUSACK 15 in the cycle 5 because no BUSREQ 12 is being issued at this time yet. In FIG. 4, since it is assumed that only the hardware operation unit 4 uses the bus, the hardware operation unit 4 again issues the BUSREQ 12 in the next cycle 1 and the MREQ is send to the memory unit 6 in response to the BUSACK 15.

In this manner, when the acknowledgement for the use of bus is continuously given to one unit, the only one selected unit can occupy the bus for a predetermined period. Accordingly, one memory process time requires only five cycles as shown in FIG. 4.

On the other hand, in FIG. 5, the hardware operation unit 4 and the data processing unit 1 alternately use the bus. Accordingly, the memory process time as viewed from the hardware operation unit 4 naturally increases. Particularly when the data processing unit 1 continuously uses the bus for a long time by an advanced control of instruction, the memory process time materially increases.

In FIG. 5, when the MREQ 1 from the hardware operation unit 4 terminates, the bus control unit 2 starts to accept the bus request. At this time, the data processing unit 1 issues the BUSREQ 10 although not shown in FIG. 5 and the BUSACK 13 is sent back in the cycle 5. As a result, the data processing unit 1 issues the MREQ 2 and the instruction is fetched from the memory unit 6. Accordingly, even if the hardware operation unit 4 has issued the BUSREQ 12 in the cycle 1, the reception thereof is delayed until the MREQ 2 from the data processing unit 1 terminates. When the MREQ 2 terminates in the cycle 3, the BUSACK 15 is issued in the cycle 4 so that the hardware operation unit 4 is allowed to issue the MREQ 1. The bus address BUSADR is alternately used by the memory addresses MADR 1 and MADR 2.

In FIG. 4, one memory process time takes five cycles since one unit exclusively occupies the bus, but in FIG. 5 it takes eight cycles since two units alternately use the bus. There are drawbacks that, in FIG. 4 the data transfer from the units or devices other than the hardware operation unit 4 is inhibited, and in FIG. 5 continuous data transfer to the memory unit 6 can not be attained even if it is required, because the hardware operation unit 4 achieves a high speed operation.

Figure 6:
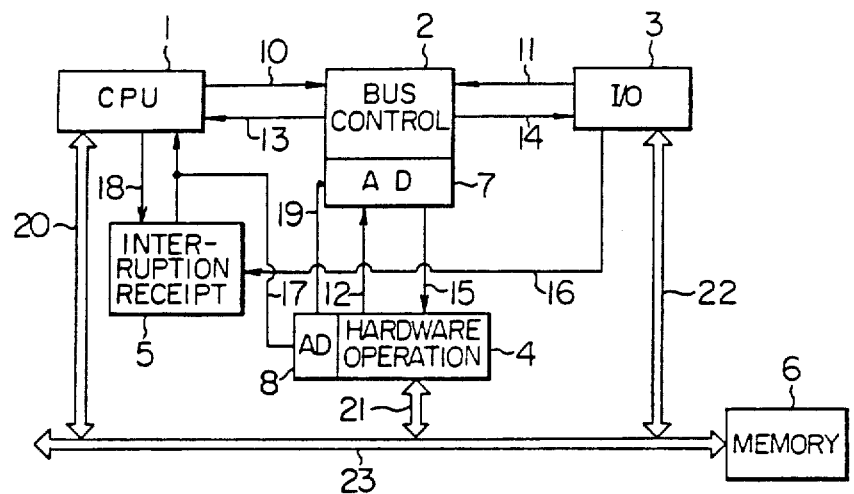
FIG. 6 shows a block diagram of a data processing system in accordance with one embodiment of the present invention.
Figure 7:
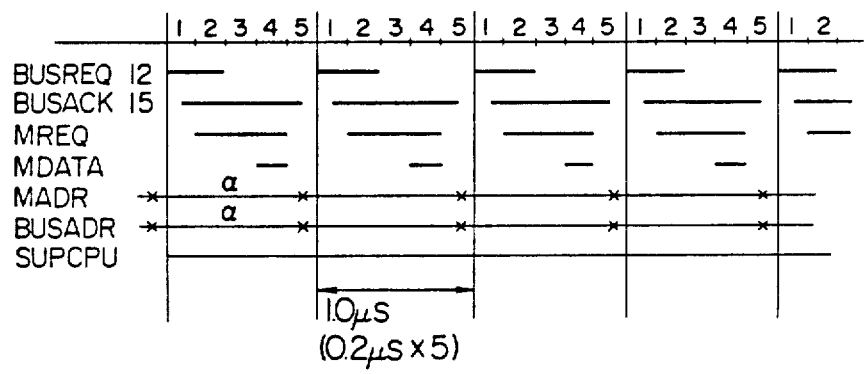
FIG. 7 shows a timing chart for the operation of FIG. 6.

FIG. 6 shows a block diagram of a bus control system of the present invention, and FIG. 7 shows a timing chart for the operation of FIG. 6.

In FIG. 6, the like numerals to those used in FIG. 3 represent the same elements. In FIG. 6, the hardware operation unit 4 and the bus control unit 2 are provided with additional sections 7 and 8 respectively, so that the representative interruption request 17 is applied to the additional section 8 of the hardware operation unit 4 and the additional section 8 sends out a suppression of the use of bus 19 to the additional section 7 of the bus control unit 2.

In FIG. 7, upon the issuance the BUSREQ 12 from the hardware operation unit 4, the bus suppression (SUPCPU) 19 is issued to the additional section 7 to inhibit the use of the bus by the data processing unit 1. Since the SUPCPU 19 functions to reject the BUSREQ 10 from the data processing unit 1, the BUSACK 13 is not issued even when the read/write operation of the memory by the hardware operation unit 4 has been completed and the memory read/write operation from the data processing unit 1 is not carried out. Accordingly, if the BUSREQ 12 is issued by the hardware operation unit 4 in the next cycle 1, it is accepted immediately and the BASACK 15 is sent back from the bus control unit 2. Thus, the memory read/write operation continues. Since one memory process time takes five cycles, it amounts to 1.0 $\mu$s assuming that one cycle takes 0.2 $\mu$s. Therefore, the memory process speed is 1.6 times as fast as that of the prior art system which is equal to eight cycles or 1.6 $\mu$s. The number of cycles will decrease if the memory unit 6 of smaller cycle time is used, but it is apparent that for a given memory unit the present system offers a faster operation speed. Furthermore, since the BUSREQ 12 is used every time, the BUSREQ 11 issued by the I/O device 3 having a higher priority for the use of the bus than the hardware operation unit 4 is not neglected but accepted. In this case, the memory process time by the hardware operation unit 4 increases but this will not raise a significant affect because the frequency is low. Further, since the presence of the interruption request is detected even during the continuous operation of the hardware operation unit 4, the interruption request is not neglected.

FIGS. 8 to 12 show, by way of example, gate diagrams of the respective units in FIG. 6.

Figure 8:
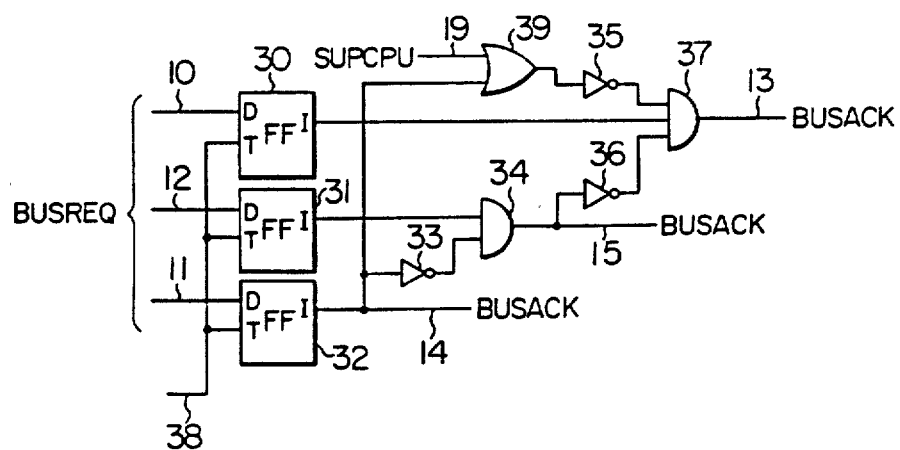
FIG. 8 shows, by way of example, a gate diagram of major parts of the bus control unit and the additional section thereof.
Figure 9:
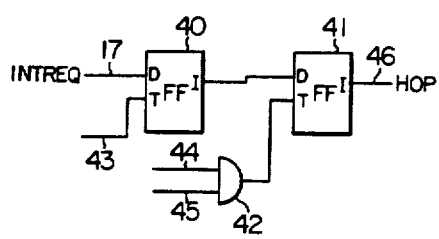
FIG. 9 shows, by way of example, a gate diagram of an interruption request detector of an additional section of the hardware operation unit shown in FIG. 6.
Figure 10:
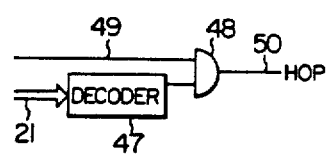
FIG. 10 shows, by way of example, a gate diagram of a circuit for issuing a reinitiation request from the data processing unit to the hardware operation unit shown in FIG. 6.
Figure 11:
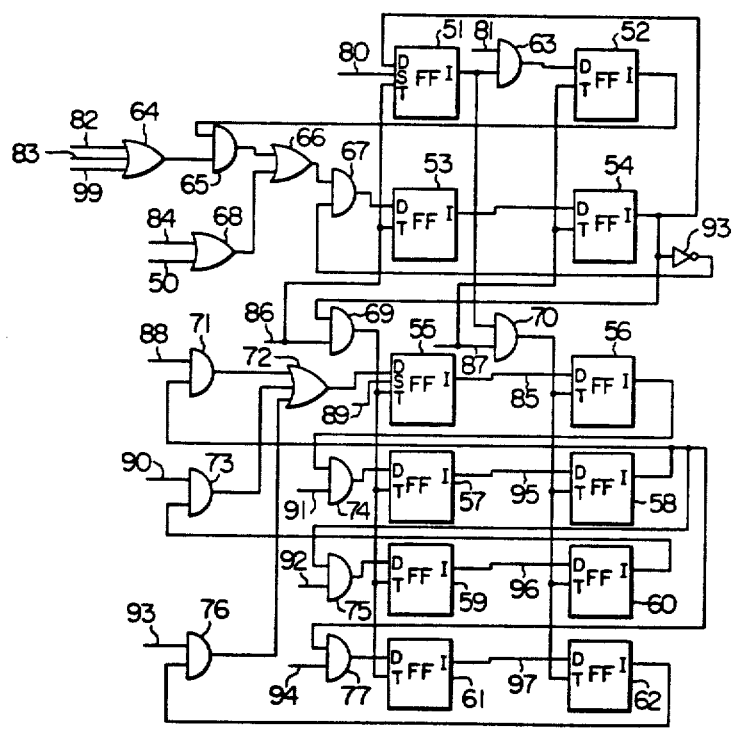
FIG. 11 shows, by way of example, a gate diagram of a main section of the hardware operation unit shown in FIG. 6.

FIG. 8 shows the bus control unit 2 and the additional section 7 thereof, FIG. 9 shows an interruption request detector in the additional section 8 of the hardware control unit 4, FIG. 10 shows a circuit for reinitiating the hardware operation unit 4 from the data processing unit 1, FIG. 11 shows a main circuit of the hardware operation unit 4, and FIG. 12 shows a signal send-out part of the additional section 8 of the hardware operation unit 4.

In FIG. 8, the BUSREQ 11 from the I/O device 3 (FIG. 6) is applied to a D-input of a flip-flop 32. An output signal of the flip-flop 32 is sent back to the I/O device 3 as the BUSACK 14 and also applied to an inverter 33 as well as an OR gate 39.

The BUSREQ 12 from the hardware operation unit 4 (FIG. 6) is applied to a D-input of a flip-flop 31. An output signal of the flip-flop 31 is applied to one input of an AND gate 34 and ANDed therein with an output signal of the inverter 33. An output signal of the AND gate 34 is sent to the hardware operation unit 4 as the BUSACK 15 and also applied to an inverter 36. The BUSREQ 10 from the data processing unit 1 (FIG. 6) is applied to a D-input of a flip-flop 30. An output signal of the flip-flop 30 is applied to one input of an AND gate 37 and ANDed therein with the respective output signals of the inverters 36 and 35. An output signal of the AND gate 37 is sent to the data processing unit 1 as the BUSACK 13. The SUPCPU 19 from the hardware operation unit 4 is applied to an OR gate 39, an output signal of which is applied to the inverter 35. A bus request reception timing signal 38 from CPU 1 (FIG. 6) is applied to the respective T-inputs of the flip-flops 30, 31 and 32 to trigger them at a predetermined interval. The timing signal 38 is issued at the predetermined interval unless the memory request is issued but it is not issued during the memory request so that other bus acknowledge is not issued during the memory request. In FIG. 8, when the BUSREQ 12 is received, the output of the flip-flop 31 is rendered high by the timing signal 38 so as to enable the AND gate 34. If there is no BUSREQ 11 from a higher priority device for the use of bus, the output of the flip-flop 32 is in its low state and therefore the output of the inverter 33 is in a high state so as to open the AND gate 34. Thus, the BUSACK 15 is issued. On the other hand, since the SUPCPU 19 is present, the OR gate 39 causes the SUPCPU 19 to pass therethrough so as to render the output of the inverter 35 low. Thus, the AND gate 37 does not meet the AND condition so that it does not produce its output signal, i.e. BUSACK 13. When the next memory request is issued in response to the BUSACK 15, the timing signal 38 is suppressed and the reception of the bus request is stopped. When the memory request terminates and the reception starts again and if the BUSREQ's 11 and 12 are received, the BUSACK 14 is issued while the BUSACK 13 and the BUSACK 15 are suppressed because the BUSREQ 11 has higher priority for the use of bus. In this manner, only the bus request from the data processing unit 1 is neglected. However, no problem arises therefrom because the data processing unit 1 does not need the retrieval of specific data by the hardware operation unit 4 during the operation thereof (although it is needed in the interruption processing). The hardware operation unit 4 plays a role of a part of the process by the data processing unit 1 and processes at a high speed. Accordingly, it is useful for the enhancement of the overall process speed to inhibit the use of bus by the data processing unit 1 to attain a smooth and high speed operation.

Referring now to FIG. 9, a circuit is shown for detecting the interruption request to inform the hardware operation unit 4 of the detected interruption request. The circuit of FIG. 9 is included in the additional section 8. The representative interruption request 17 is applied to a D-input of a flip-flop 40, and an output signal of the flip-flop 40 is in turn applied to a D-input of a flip-flop 41. A "1" output signal 46 of the flip-flop 41 is applied to the hardware operation unit (HOP) 4 as an interruption request detection signal. A timing signal 43 from the CPU 1 (FIG. 6) is applied to a T-input of the flip-flop 40. An acknowledgement for the interruption request detection 44 and a timing signal 45 from the CPU 1 (FIG. 6) is ANDed in an AND gate 42 and an output signal of the AND gate 42 is applied to a T-input of the flip-flop 41. The timing signals 43 and 45 are needed to synchronize the asynchronous signals with the hardware operation unit 4 and they have duration sufficient for the flip-flop 40 to stabilize itself. In the case where the representative interruption request 17 is in synchronism with the hardware operation unit 4, the flip-flop 40 is not necessary. When the representative interruption request 17 is received, the flip-flop 40 is triggered by the timing signal 43 and after it has sufficiently stabilized itself the flip-flop 41 is triggered by the timing signal 45 under the condition that the interruption request detection acknowledge 44 is present at the input of the AND gate 42. If the flip-flop 40 fails to be set by the timing signal 43, the flip-flop 41 is not set by the next timing signal 45 but they are set by the subsequent timing signals 43 and 45. The interruption request detection acknowledgement 44 is coupled to the hardware operation unit 4 and produced at a time convenient for the hardware operation unit 4.

FIG. 10 will be now explained. When the interruption request is detected and the hardware operation unit 4 is waiting, the data processing unit 1 must issue an initiation signal to reinitiate the operation of the hardware operation unit 4. The circuit of FIG. 10 detects the initiation signal and applies it to the hardware operation unit 4. In FIG. 10, the bus address data 21 is decoded by a decoder 47. In the case where the decoder 47 decodes that the bus address data is the reinitiation command issued from the data processing unit 1, the decoder 47 produces its output which is ANDed by an AND gate 48 with a command control signal 49 indicating that the command has been issued from the data processing unit 1 so that the AND gate 48 produces its output signal 50 to inform the hardware operation unit 4 of the initiation command. Accordingly, the data processing unit 1 checks in the interruption processing operation whether the hardware operation unit 4 is waiting or not so that the data processing unit 1 may issue the initiation signal in the case where the hardware operation unit 4 is waiting.

FIG. 11 will be now explained. It shows a main circuit of the hardware operation unit 4 and controls for issuing the bus request and the memory request and detecting the interruption request for waiting. The circuit of FIG. 11 generally comprises a main stage including flip-flops 55-62 and a sub-stage including flip-flops 51-54. The sub-stage functions to control the on and off states of the main stage. A sub-stage start signal 80 which is obtained by decoding the address signal is applied to an S-input of the flip-flop 51, an output signal of which is ANDed with a sub-stage stop signal 81 which is also obtained by decoding the address signal, in an AND gate 63. The output signal of the flip-flop 51 is also applied to an AND gate 70. An output signal of the AND gate 63 is applied to a D-input of the flip-flop 52, an output signal of which is ANDed with an output of an OR gate 64 in an AND gate 65. The OR gate 64 receives an ANDed output signal 82 of the output signal of the flip-flop 58 and an operation completion signal, another ANDed output signal 83 of the output signal of the flip-flop 58 and the interruption request detection signal 46 (FIG. 9), and a still another ANDed output signal 99 of the output signal of the flip-flop 58 and a reinitiation condition signal (no AND gates for this operation are shown in FIG. 11). An output signal of the AND gate 65 is applied to an input of an OR gate 66 which receives an output signal of an OR gate 68 at the other input thereof. An OR gate 68 receives at its one input an ORed signal 84 of a response signal indicating the completion of the memory operation from the memory unit 6 and the bus acknowledge signal, and at its other input the initiation command 50 from the data processing unit 1. An output signal of the OR gate 66 is ANDed in the AND gate 67 with an inverted output of the flip-flop 54 inverted by an inverter 98, and an output signal of the AND gate 67 is applied to a D-input of the flip-flop 53. An output signal of the flip-flop 53 is applied to a D-input of the flip-flop 54 and an output signal of the flip-flop 54 is applied to a D-input of the flip-flop 51, an AND gate 69 and the inverter 98. A timing signal 86 from the CPU 1 (FIG. 6) is applied to the AND gate 69 and the respective T-inputs of the flip-flops 51 and 53 and a timing signal 87 from the CPU 1 (FIG. 6) is applied to the AND gate 70 and the respective T-inputs of the flip-flops 52 and 54. The output signal of the AND gate 69 is applied to the respective T-inputs of the flip-flops 55, 57, 59 and 61 and the output signal of the AND gate 70 is applied to the respective T-inputs of the flip-flops 56, 58, 60 and 62. A main stage start signal 89 obtained by decoding the address signal is applied to an S-input of the flip-flop 55, an output signal 85 of which is applied to a D-input of the flip-flop 56. An output signal of the flip-flop 56 is ANDed, in an AND gate 74, with a stage condition signal 91 indicating the condition that no interruption occurs and the bus request is accepted. An output signal of the AND gate 74 is applied to a D-input of the flip-flop 57. An output signal 95 of the flip-flop 57 is applied to a D-input of the flip-flop 58, an output signal of which is applied to one input of each of AND gates 71, 75 and 77. The AND gate 71 receives at its other input a stage condition signal 88 indicating no memory-error or the like. An output signal of the AND gate 71 is applied to an OR gate 72. The AND gate 75 receives at its other input a stage condition signal 92 indicating the condition of either completion of target data or occurrence of memory error. An output signal of the AND gate 75 is applied to a D-input of the flip-flop 59. An output signal 96 of the flip-flop 59 is applied to a D-input of the flip-flop 60. An output signal of the flip-flop 60 is ANDed with a stage condition signal 90 indicating the condition of reinitiation of operation, in the AND gate 73. An output signal of the AND gate 73 is applied to one input of the OR gate 72. The AND gate 77 receives at its other input a stage condition signal 94 indicating the condition of detection of interruption request and an output signal of the AND gate 77 is applied to a D-input of the flip-flop 61. An output signal 97 of the flip-flop 61 is applied to a D-input of the flip-flop 62. An output signal of the flip-flop 62 is ANDed with a stage condition signal 93 indicating the condition of detection of interruption request and waiting of reinitiation, in an AND gate 76 and an output signal of the AND gate 76 is applied to an OR gate 72. An output signal of the OR gate 72 is applied to a D-input of the flip-flop 55.

The operation of the circuit of FIG. 11 will be now explained. In the sub-stage, when the sub-stage start signal 80 in the form of pulse is applied to the flip-flop 51, the output of the flip-flop 51 is rendered high. If the sub-stage stop signal 81 is in its off or high state, the AND gate 63 meets the AND condition and the output of the flip-flop 52 is rendered high upon the application of the timing signal 87. When the output of the flip-flop 52 is rendered high and if the stage condition signal 82 or 83 is in its on or high state, the AND gate 65 meets the AND condition and provides an ANDed output signal to the OR gate 66. Since the AND condition is met in the AND gate 67 by the output signal of the OR gate 66 and the off or low condition of the output of the flip-flop 54, the output of the flip-flop 53 is rendered high upon the application of the timing signal 86 and the output of the flip-flop 51 is simultaneously rendered low (the D-input of the flip-flop 51 being in its off or low state because the output of the flip-flop 54 is in its off or low state). When the output of the flip-flop 53 is rendered high, the output of the flip-flop 54 is rendered high upon the application of the next timing signal 87 and the output of the flip-flop 52 is simultaneously rendered low (because the output of the flip-flop 51 is in its off or low state). When the output of the flip-flop 54 is rendered high, the output of the flip-flop 51 is rendered high at the timing pulse 86 and the output of the flip-flop 53 becomes low. So long as either the sub-stage stop signal 81 is in its off or high state or the D-input of the flip-flop 53 is conditioned, the on and off states of the flip-flops proceed ringwise. When it is desired to stop the sub-stage, the sub-stage stop signal 81 is rendered on or low.

The main stage will be now explained. Upon application of the main stage start pulse signal 89, the output of the flip-flop 55 is rendered high and the output of the flip-flop 56 is then rendered high through the AND condition between the next timing signal 87 and the high output of the flip-flop 51 of the sub-stage. When the output of the flip-flop 56 becomes high and if the stage condition signal 91 is on, the output of the flip-flop 57 is rendered high through the AND condition between the timing signal 86 and the high output of the flip-flop 54 of the sub-stage, and the output of the flip-flop 55 is simultaneously rendered high. As the output of the flip-flop 57 becomes high, the output of the flip-flop 58 is rendered high upon the application of the timing signal 87 (hereinafter the AND condition between the timing signal 87 and the high output of the flip-flop 51 is omitted. The same is true for the timing signal 86), and the output signal of the flip-flop 56 is simultaneously rendered low. As the output of the flip-flop 58 becomes high, if the stage condition signal 88 is in its on or high state when the timing signal 86 is high, the output of the flip-flop 55 is rendered high through the AND gate 71, and if the stage condition signal 92 is in its on or high state, the output of the flip-flop 59 is rendered high through the AND gate 75, and if the stage condition signal 94 is in its on or high state, the output of the flip-flop 61 is rendered high through the AND gate 77. It is noted that in this operation the output of only one of those flip-flops is rendered high. When the output of the flip-flop 59 becomes high, the output of the flip-flop 60 is rendered high upon the application of the timing signal 87 and if the stage conditioning signal 90 is in its on or high state when the timing signal 86 becomes high, the output of the flip-flop 55 becomes high. On the other hand, when the output of the flip-flop 61 becomes high, the output of the flip-flop 62 becomes high upon the application of the timing signal 87 and if the stage condition signal 93 is its on or high state upon the application of the timing signal 86 the output of the flip-flop 55 is rendered high.

In this manner, the operation of the main stage starts at the flip-flops 55 and 56 and the bus request is sent out. At the timing when such a condition that the stage condition signal 91 is in its on or high state and the stage condition signal 84 of the sub-stage is also in its on or high state (bus acknowledge being in its on or high state) is met, the operation is transmitted to the flip-flops 57 and 58 (the on or high period of the stage condition signal 84 is not always constant) and the flip-flops 57 and 58 issue the memory request. At the timing when the condition that the stage condition signal 88 is on or high and the stage condition signal 84 of the sub-stage is also on or high is met, the operation is back to the flip-flops 55 and 56 so that these flip-flops are triggered again, or at the timing when the condition that both the stage condition signal 92 and the stage conditioning signal 82 of the sub-stage are on or high is met, the operation is transferred to the flip-flops 59 and 60 so that these flip-flops are triggered to perform the control to terminate the operation, or at the timing when the condition that both the stage condition signal 94 and the stage condition signal 83 of the sub-stage are on or high is met, the operation is turned to the flip-flops 61 and 62 so as to wait for the reinitiation. The operation may be terminated by the flip-flops 59 and 60, or it may be carried out again by triggering the flip-flops 55 and 56 under the condition that both the stage condition signal 90 and the stage condition signal 99 of the sub-stage are on or high. The AND gate 73 is not always necessary and the operation may be immediately terminated.

The flip-flops 61 and 62 trigger the flip-flops 55 and 56 under the condition that both the stage condition signal 93 and the stage condition signal 50 of the sub-stage are high so as to send out the bus request.

Figure 12A:
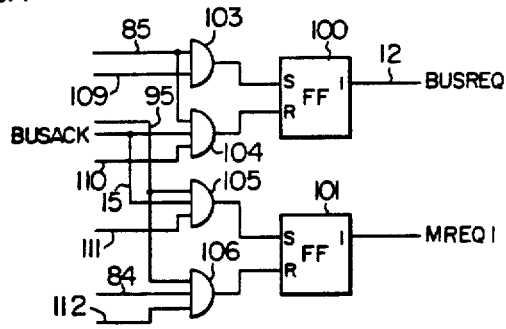
FIGS. 12A and 12B show, by way of example, gate diagrams of signal sending sections of an additional unit of the hardware operation unit shown in FIG. 6.
Figure 12B:
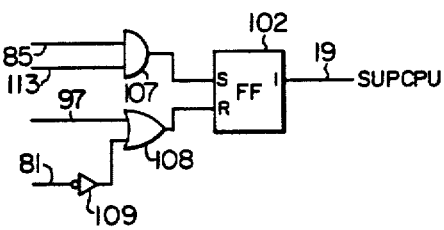

FIGS. 12A and 12B are will be now explained. FIG. 12A shows a logic circuit for sending out the bus request and the memory request, and FIG. 12B shows a logic circuit for sending out the suppression for the use of bus by the data processing unit. The output signal 85 of the flip-flop 55 (FIG. 11) and a stage condition signal 109 (a flip-flop set signal obtained by ANDing the output of flip-flop 52 and the timing signal 86) are applied to an AND gate 103, an output signal of the AND gate 103 is applied to an S-input of the flip-flop 100. An output signal of the flip-flop 100 is applied as the BUSREQ 12 to the bus control unit 2. The output signal 85 of the flip-flop 55, the BUSACK 15 and a stage condition signal 110 (a signal obtained by ANDing the output of the flip-flop 54 and the timing signal 86) are applied to an AND gate 104, and an output signal of the AND gate 104 is applied to an R-input of the flip-flop 100. The output signal 95 of the flip-flop 57, the BUSACK 15 and a stage condition signal 111 (a signal obtained by ANDing the output of the flip-flop 51 and the timing signal 87) are applied to an AND gate 105, and an output signal of the AND gate 105 is applied to an S-input of a flip-flop 101. An output signal MREQ 1 of the flip-flop 101 is applied to the memory unit 6. the output signal 95, the stage condition signal 84 and a stage condition signal 112 (a signal obtained by ANDing the output signal of the flip-flop 53 and the timing signal 87) are applied to an AND gate 106, and an output signal of the AND gate 106 is applied to an R-input of the flip-flop 101. In FIG. 12B, the output signal 85 of the flip-flop 55 and a stage condition signal 113 (which is the same as the condition of signal 109) are applied to an AND gate 107, and an output signal of the AND gate 107 is applied to an S-input of the flip-flop 102. An output signal SUPCPU 19 of the flip-flop 102 is applied to the bus control unit 2. The output signal 97 of the flip-flop 61 and the substage signal 81 passed through an inverter 209 are applied to an OR gate 108, and an output signal of the OR gate 108 is applied to an R-input of the flip-flop 102.

The operations of the circuits of FIGS. 12A and 12B are now explained. When the output of the flip-flop 55 becomes high and therefore the signal 85 is high, the output of the flip-flop 100 is rendered high under the condition that the condition signal 109 is on or high. Thus, the BUSREQ 12 is issued to the bus control unit 2. When the BUSREQ 12 is accepted by the bus control unit 2, the bus control unit 2 sends back the BUSACK 15, and when the output signal 95 is on or high the flip-flop 100 is reset by the stage condition signal 110. The output of the flip-flop 101 is rendered high by the stage condition signal 111 and the output signal MREQ 1 thereof is sent to the memory unit 6. When the memory unit 6 sends back a response to this MREQ 1 and the stage condition signal 84 becomes on or high, the flip-flop 101 is reset by the stage condition signal 112 so that the MREQ 1 is terminated. The flip-flop 102 is set by the stage condition signal 113 when the output signal 85 of the flip-flop 55 is in its on or high state, so that the SUPCPU 19 is sent to the bus control unit 2. The bus control unit 2 then inhibits the use of the bus by the data processing unit 1 in response to the SUPCPU 19. When the interruption is detected and the output of the flip-flop 61 is rendered high, the flip-flop 102 is reset by the output signal 97 of the flip-flop 61. When the interruption operation is not in progress, it is also reset by the on or low state of the sub-stage stop signal 81.

In a modification of the embodiment of the present invention shown in FIG. 8, the SUPCPU 19 is not used and the use of the bus by the lowest priority data processing unit 1 is suppressed. Namely, by continuously keeping the bus request 10 in its on or high state, the use of the bus by the data processing unit 1 is inhibited when the bus request is issued from a the unit other than the data processing unit 1 but the data processing unit 1 is allowed to use the bus when the bus request from a unit other than the data processing unit 1 is not present.

In the above case, by keeping the BUSREQ 12 on or high during the continued processing operation of the hardware operation unit 4, the use of the bus by the lowest priority data processing unit 1 is inhibited and the hardware operation unit 4 is allowed to process. In this method, one memory process time takes four cycles and the operation speed is further increased.

Figure 13:
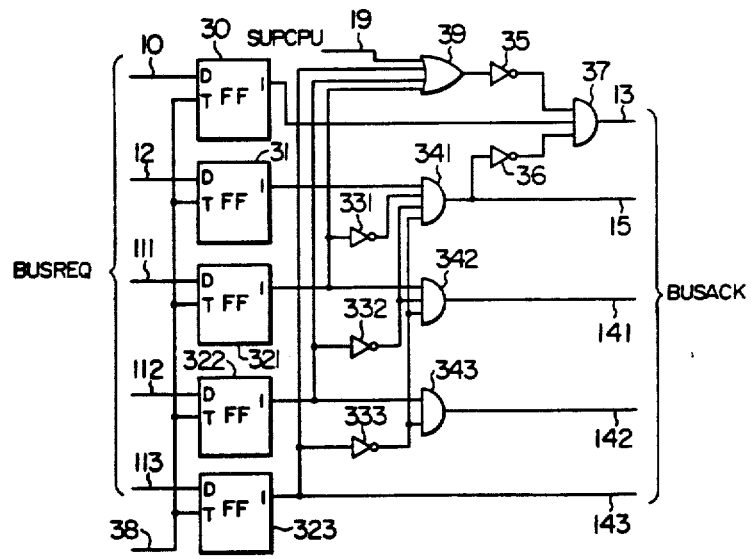
FIG. 13 shows a block diagram to explain another embodiment of the present invention.

In the embodiment explained above, only one I/O device is shown. In an actual data processing system, it is usual to couple a plurality of I/O devices to the bus. FIG. 13 shows a modification therefor, which is an expansion of the embodiment shown in FIG. 8. BUSREQ's 211, 212 and 213 from three I/O devices are applied to D-inputs of flip-flops 321, 322 and 323, respectively. An output signal from the flip-flop 321 is applied to an AND gate 342 and an OR gate 39, and to an AND gate 341 through an inverter 331. Similarly, an output signal from the flip-flop 322 is applied to an AND gate 343 and the OR gate 39, and to the AND gate 342 through an inverter 332. An output signal of the flip-flop 323 is used as the BUSACK 143 and also applied to the OR gate 39. The rest of the arrangement is similar to that of FIG. 8 and readily understood from the explanation for FIG. 8. Of the plurarity of I/O devices, the I/O device which issues the BUSREQ 213 is given the highest priority. When the BUSREQ 213 is issued, the BUSACK 143 is issued and other BUSREQ's are inhibited. The next higher priority I/O device is the one which issues the BUSREQ 212. When the BUSREQ 212 is issued in the absence of the BUSREQ 213, the BUSACK 142 is issued. The lowest priority I/O device is the one which issues the BUSREQ 211. When the BUSREQ 211 is issued in the absence of the bus request from the other I/O devices, the BUSACK 141 is issued, and the reception of the BUSREQ's 10 and 12 for the hardware operation unit and the data processing unit is inhibited.

In this manner, the present invention is readily applicable to the system having a plurality of I/O devices.

In FIG. 9, by applying a signal which is obtained by ANDing the INTREQ 17 and an interruption ignoring signal, to the D-input of the flip-flop 40, the interruption may be temporarily ignored. On the other hand, by applying a signal which is obtained by ANDing an acknowledgement for interruption issued from the data processing unit 1 and the INTREQ 17, to the D-input of the flip-flop 40, the hardware operation unit 4 may be operated without caring the acknowledgement for the interruption by the data processing unit 1.

The main stage shown in FIG. 11 may be sequentially controlled by a ROM (read-only memory) or program-controlled by a microprocessor.

While the bus requests in the bus control unit shown in FIG. 8 are received in parallel, they may be received in series.

In the present invention, the system may not be an interruption system and the I/O devices are not always necessary. The bus control is not limited to that for the memory unit but it may be applied to the control for the I/O devices.

I claim:

1. A bus control system comprising:

a. bus means for transferring data and a control command therethrough;

b. memory means connected to said bus means for storing data transferred through said bus means;

c. first data processing means connected to said bus means for processing data and exchanging data with at least said memory means through said bus means;

d. second processing means connected to said bus means for processing data transferred through said bus means at a higher speed than said first processing means and exchanging data with at least said memory means through said bus means, said second processing means functioning in the role of processing of data by the first processing means;

e. input/output means connected to said bus means for exchanging data with at least said memory means and for processing input/output data;

f. bus control means for checking if bus requests for the use of said bus means are issued from said first processing means, said second processing means and said input/output means and for issuing a bus acknowledgment for the use of said bus means to one of said first processing means, said second processing means and said input/output means whose bus request is accepted;

g. priority resolution means for setting priorities for the acknowledgment to the requests for the use of said bus means from said first processing means, said second processing means and said input/output means in the order of said input/output means, said second processing means and said first processing means;

h. inhibit signal generating means for continuously generating an inhibit signal to be used to inhibit the use of said bus means by said first data processing means when said second processing means continuously uses said bus means;

i. said bus control means including means associated with each input/output device, the second processing means and the first data processing means for generating a bus acknowledgment in response to a received bus request if a higher priority bus request has not been received, and gate means coupled to the inhibit signal generating mean which passes the bus acknowledgment of the first processor when the inhibit signal is not present and when a higher priority bus request is not present and suppresses the generation of the bus acknowledgment signal by the means for generating a bus acknowledgment signal associated with the first processing means when the inhibit signal is present; and j. bus usage inhibit means provided in said bus control means for receiving said inhibit signal and continuously the issuing of a bus acknowledgment by said first data processing means to prevent usage of said bus means by said first data processing means.

2. A bus control system according to claim 1, further comprising interruption request processing means for detecting any interruption request from said input/output means and for issuing, upon detection of the interruption request, an interruption request to said first processing means and said second processing means.

3. A bus control system according to claim 1, wherein said system further comprises decode means for decoding said control command as a reinitiation command from said first processing means to reinitiate the processing operation of said second processing means which is in a waiting state consequent from an interruption request issued by said input/output means.

4. A bus control system according to claim 1, wherein said priority resolution means includes priority resolution means for a plurality of input/output means.

5. A bus control system according to claim 1, wherein said inhibit signal generating means generates said inhibit signal in a timed relation with the issuance to said bus control means of the bus request for the use of said bus means by said second processing means.

6. A bus control system according to claim 5, wherein said inhibit signal generating means generates said inhibit signal upon issuance to said bus control means from said second processing means of the bus request for the use of said bus means by said second processing means.

7. A bus control system according to claim 6, wherein said inhibit signal generating means continuously generates said inhibit signal over a predetermined time period commencing at the issuance of said bus request even after said request terminates.

8. A bus control system according to claim 1, wherein said inhibit signal generating means continuously generates said inhibit signal over a period in which said second processing means makes access to said memory means a plurality of times through said bus means.

9. A bus control system according to claim 1, wherein said bus control means allows the use of said bus means by said first data processing means when said bus control means accepts the bus request from said first processing means for the use of said bus means during a period when said inhibit signal generating means does not issue said inhibit signal in the absence of the bus request from said input/output means and said second processing means for the use of said bus means by said input/output means and said second processing means.

10. A bus control system comprising:

a. bus means for transferring data and a control command therethrough;

b. memory means connected to said bus means for storing data transferred through said bus means;

c. first data processing means connected to said bus means for processing data and exchanging data with at least said memory means through said bus means;

d. second processing means connected to said bus means for processing data transferred through said bus means at a higher speed than said first processing means and exchanging data with at least said memory means through said bus means, said second processing means functioning in the role of processing of data by the first processing means;

e. input/output means connected to said bus means for exchanging data with at least said memory means and for processing input/output data;

f. bus control means for checking if bus requests for the use of said bus means are issued from said first processing means, said second processing means and said input/output means and for issuing a bus acknowledgment for the use of said bus means to one of said first processing means, said second processing means and said input/output means whose bus request is accepted;

g. priority resolution means for setting priorites for the acknowledgment to the requests for the use of said bus means from said first processing means, said second processing means and said input/output means in the order of said input/output means, said second processing means and said first processing means;

h. inhibit signal generating means for continuously generating an inhibit signal to be used to inhibit the use of said bus means by said first data processing means when said second processing means continuously uses said bus means;

i. said bus control means including a means associated with each input/output device, the second processing means and the first data processing means for generating a bus acknowledgment in response to a received bus request if a higher priority bus request has not yet been received, and gate means coupled to the inhibit signal generating means which passes the bus acknowledgment of the first processor when the inhibit signal is not present and when a higher priority bus request is not present and suppresses the generation of the bus acknowledgment signal by the means for generating a bus acknowledgment signal associated with the first processing means when the inhibit signal is present;

j. bus usage inhibit means provided in said bus control means for receiving said inhibit signal and continuously inhibiting the issuing of a bus acknowledgment by said first data processing means to prevent usage of said bus means by said first data processing means;

k. interruption request processing means for detecting any interruption request from said input/output means and for issuing, upon detection of the interruption request, an interruption request to said first processing means and said second processing means; and l. decode means for decoding said control command as a reinitiation command from said first processing means to reinitiate the processing operation of said second processing means which is in a waiting state consequent from an interruption request issued by said input/output means.

11. A bus control system according to claim 10, wherein said priority resolution means includes priority resolution means for a plurality of input/output means.

12. A bus control system acccording to claim 10, wherein said inhibit signal generating means generates said inhibit signal in a timed relation with the issuance to said bus control means of the bus request for the use of said bus means by said second processing means.

13. A bus control system according to claim 12, wherein said inhibit signal generating means generates said inhibit signal upon issuance to said bus control means from said second processsing means of the bus request for the use of said bus means by said second processing means.

14. A bus control system according to claim 13, wherein said inhibit signal generating means continuously generates said inhibit signal over a predetermined time period commencing at the issuance of said bus request even after said request terminates.

15. A bus control system according to claim 10, wherein said inhibit signal generating means continuously generates said inhibit signal over a period in which said second processing means makes access to said memory means a plurality of times through said bus means.

16. A bus control system according to claim 10, wherein said bus control means allows the use of said bus means by said first data processing means when said bus control means accepts the bus request from said first processing means for the use of said bus means during a period when said inhibit signal generating means does not issue said inhibit signal in the absence of the bus request from said input/output means and said second processing means for the use of said bus means by said input/output means and said second processing means.

* * * * *